US005203208A

United States Patent [19]

Bernstein

[11] Patent Number: 5,203,208

[45] Date of Patent: Apr. 20, 1993

[54] SYMMETRICAL MICROMECHANICAL GYROSCOPE

[75] Inventor: Jonathan J. Bernstein, Medfield, Mass.

[73] Assignee: The Charles Stark Draper Laboratory, Cambridge, Mass.

[21] Appl. No.: 693,326

[22] Filed: Apr. 29, 1991

[51] Int. Cl.[5] .......... G01P 9/04

[52] U.S. Cl. .......... 73/505

[58] Field of Search .......... 73/505, 504, 517 B; 74/5 F

[56] References Cited

U.S. PATENT DOCUMENTS

| | | | |
|---|---|---|---|
| 2,505,636 | 4/1950 | Carter | 73/505 |
| 3,053,095 | 9/1962 | Koril et al. | 73/504 |
| 3,251,231 | 5/1966 | Hunt et al. | 73/505 |
| 3,370,458 | 2/1968 | Dillon | 73/141 |
| 3,702,568 | 11/1972 | Howe | 74/5 F |
| 3,913,035 | 10/1975 | Havens | 331/107 R |
| 4,044,305 | 8/1977 | Oberbeck | 324/154 R |
| 4,234,666 | 11/1980 | Gursky | 428/573 |
| 4,321,500 | 3/1982 | Paros et al. | 310/321 |
| 4,342,227 | 8/1982 | Petersen et al. | 73/510 |
| 4,381,672 | 5/1983 | O'Connor et al. | 73/505 |
| 4,406,992 | 9/1983 | Kurtz et al. | 338/2 |
| 4,411,741 | 10/1983 | Janata | 204/1 T |
| 4,447,753 | 8/1984 | Ochiai | 310/312 |
| 4,468,584 | 8/1984 | Nakamura et al. | 310/370 |
| 4,478,076 | 10/1984 | Bohrer | 73/204 |
| 4,478,077 | 10/1984 | Bohrer et al. | 73/204 |
| 4,483,194 | 11/1984 | Rudolf | 73/517 R |
| 4,484,382 | 11/1984 | Kawashima | 29/25.35 |
| 4,490,772 | 12/1984 | Blickstein | 361/281 |
| 4,495,499 | 1/1985 | Richardson | 343/5 DD |
| 4,499,778 | 2/1985 | Westhaver et al. | 74/5 F |
| 4,502,042 | 2/1985 | Wuhrl et al. | 340/568 |
| 4,522,072 | 6/1985 | Sulouff et al. | 73/765 |
| 4,524,619 | 6/1985 | Staudte | 73/505 |
| 4,538,461 | 9/1985 | Juptner et al. | 73/505 |
| 4,585,083 | 4/1986 | Nishiguchi | 177/229 |
| 4,592,242 | 6/1986 | Kempas | 74/5 F |
| 4,596,158 | 6/1986 | Strugach | 74/5 F |
| 4,598,585 | 7/1986 | Boxenhorn | 73/503 |
| 4,600,934 | 7/1986 | Aine et al. | 357/26 |
| 4,619,001 | 10/1986 | Kane | 455/192 |
| 4,621,925 | 11/1986 | Masuda et al. | 356/350 |
| 4,628,283 | 12/1986 | Reynolds | 331/68 |
| 4,629,957 | 12/1986 | Walters et al. | 318/662 |
| 4,639,690 | 1/1987 | Lewis | 331/96 |
| 4,644,793 | 2/1987 | Church | 73/505 |
| 4,651,564 | 3/1987 | Johnson et al. | 73/204 |
| 4,653,326 | 3/1987 | Danel et al. | 73/517 R |
| 4,654,663 | 3/1987 | Alsenz et al. | 340/870.3 |
| 4,665,605 | 5/1987 | Kempas | 29/434 |
| 4,670,092 | 6/1987 | Motamedi | 156/643 |
| 4,671,112 | 6/1987 | Kimura et al. | 73/505 |

(List continued on next page.)

FOREIGN PATENT DOCUMENTS

| | | | |
|---|---|---|---|
| 1315839 | 1/1964 | France | 73/505 |

(List continued on next page.)

OTHER PUBLICATIONS

Barth, P. W. et al., "A Monolithic Silicon Accelerometer with Integral Air Damping and Overrange Protection," IEEE, pp. 35-38.

(List continued on next page.)

*Primary Examiner*—John E. Chapman
*Attorney, Agent, or Firm*—Weingarten, Schurgin, Gagnebin & Hayes

[57] ABSTRACT

A symmetrical micromechanical gyroscope includes an inertial mass symmetrically supported about both drive and sense axes, for detecting rotational movement about an input axis. Two pairs of flexures attached to diametrically opposed sides of the inertial mass support the mass within a gyroscope support frame. Each of the flexures are oriented at generally a 45° angle from both the drive and the sense axes. In response to an applied drive signal, the inertial mass is induced to vibrate about a drive axis which is co-planar with and orthogonal to the sense axis. Both pair of flexures participate equally during rotation of the mass.

10 Claims, 2 Drawing Sheets

U.S. PATENT DOCUMENTS

| | | | |
|---|---|---|---|
| 4,674,180 | 6/1987 | Zavracky et al. | 29/622 |
| 4,674,319 | 6/1987 | Muller et al. | 73/23 |
| 4,679,434 | 7/1987 | Stewart | 73/517 B |
| 4,680,606 | 7/1987 | Knutti et al. | 357/26 |
| 4,699,006 | 10/1987 | Boxenhorn | 73/517 AV |
| 4,705,659 | 11/1987 | Bernstein et al. | 264/29.6 |
| 4,706,374 | 11/1987 | Murkami | 437/225 |
| 4,712,439 | 12/1987 | North | 74/84 R |
| 4,736,629 | 4/1988 | Cole | 73/517 R |
| 4,743,789 | 5/1988 | Puskas | 310/316 |
| 4,744,248 | 5/1988 | Stewart | 73/505 |
| 4,744,249 | 5/1988 | Stewart | 73/505 |
| 4,747,312 | 5/1988 | Herzl | 73/861.38 |
| 4,750,364 | 7/1988 | Kawamura et al. | 73/510 |
| 4,764,244 | 8/1988 | Chitty et al. | 156/630 |
| 4,776,924 | 10/1988 | Delapierre | 156/647 |
| 4,783,237 | 11/1988 | Aine et al. | 437/15 |
| 4,789,803 | 12/1988 | Jacobsen et al. | 310/309 |
| 4,792,676 | 12/1988 | Hojo et al. | 250/231 GY |
| 4,805,456 | 2/1989 | Howe et al. | 73/517 AV |
| 4,808,948 | 2/1989 | Patel et al. | 331/4 |
| 4,851,080 | 7/1989 | Howe et al. | 156/647 |
| 4,855,544 | 8/1989 | Glenn | 200/61.45 R |
| 4,869,107 | 9/1989 | Murakami | 73/517 R |
| 4,882,933 | 11/1989 | Petersen et al. | 73/517 R |
| 4,884,446 | 12/1989 | Ljung | 73/505 |
| 4,890,812 | 1/1990 | Chechile et al. | 248/674 |
| 4,893,509 | 1/1990 | MacIver et al. | 73/517 AV |
| 4,899,587 | 2/1990 | Staudte | 73/505 |
| 4,900,971 | 2/1990 | Kawashima | 310/361 |
| 4,901,586 | 2/1990 | Blake et al. | 73/862.59 |
| 4,916,520 | 4/1990 | Kurashima | 357/71 |
| 4,922,756 | 5/1990 | Henrion | 73/517 B |
| 5,001,383 | 3/1991 | Kawashima | 310/367 |
| 5,016,072 | 5/1991 | Greiff | 357/26 |
| 5,025,346 | 6/1991 | Tang et al. | 361/283 |

FOREIGN PATENT DOCUMENTS

| | | |
|---|---|---|
| 55-121728 | 9/1980 | Japan . |
| 58-136125 | 8/1983 | Japan . |
| 59-037722 | 3/1984 | Japan . |
| 59-158566 | 9/1984 | Japan . |
| 61-144576 | 7/1986 | Japan . |
| 62-071256 | 8/1987 | Japan . |
| 62-221164 | 9/1987 | Japan . |
| 63-169078 | 7/1988 | Japan . |
| 2183040 | 5/1987 | United Kingdom . |

OTHER PUBLICATIONS

Boxenhorn, B., et al., "An Electrostatically Rebalanced Micromechanical Accelerometer," AIAA Guidance, Navigation and Control Conference, Boston, Aug. 14-16, 1989, pp. 118-122.

Boxenhorn, B., et al., "Micromechanical Inertial Guidance System and its Application," Fourteenth Biennial Guidance Test Symposium, vol. 1, Oct. 3-5, 1989, pp. 113-131.

Boxenhorn, B., et al., "Monolithic Silicon Accelerometer," *Transducers* '89, Jun. 25-30, 1989, pp. 273-277.

Boxenhorn, B., et al., "A Vibratory Micromechanical Gyroscope," AIAA Guidance, Navigation and Control Conference, Minneapolis, Aug. 15-17, 1988, pp. 1033-1040.

Howe, R., et al., "Silicon Micromechanics: Sensors and Actuators on a Chip," IEEE Spectrum, Jul. 1990, pp. 29-35.

Moskalik, L., "Tensometric Accelerometers with Overload Protection," Meas. Tech. (U.S.A.), vol. 22, No. 12, Dec. 1979 (publ. May 1980), pp. 1469-1471.

Petersen, K. E. et al., "Micromechanical Accelerometer Integrated with MOS Detection Circuitry," IEEE, vol. ED-29, No. 1 (Jan. 1982), pp. 23-27.

Petersen, Kurt E., et al., "Silicon as a Mechanical Material," *Proceedings of the IEEE,* vol. 70, No. 5, May 1982, pp. 420-457.

Rosen, Jerome, "Machining in the Micro Domain," *Mechanical Engineering,* Mar. 1989, pp. 40-46.

M. Nakamura et al., "Novel Electromechanical Micro-Machining and Its Application for Semiconductor Acceleration Sensor IC," *Digest of Technical Papers,* (1987), Institute of Electrical Engineers of Japan, pp. 112-115.

Teknekron Sensor Development Corporation, article entitled "Micro-Vibratory Rate Sensor," 1080 Marsh Rd., Menlo Park, CA., 94025, 2 pages, undated.

SYMMETRICAL MICROMECHANICAL GYROSCOPE

FIELD OF THE INVENTION

This invention relates to gyroscopes and more particularly, to a monolithic, micromachined, gyroscope.

BACKGROUND OF THE INVENTION

Micromechanical gyroscopes which are micromachined from a single silicon substrate are now well known in the art. Such devices typically have a gimbaled structure which includes an inner gimbal ring having a set of flexures coupled to a mass. The inner gimbal ring serves as the sense axis. The inner gimbal ring is located within an outer gimbal ring which serves as the drive axis and is coupled to a gyroscope frame by an outer set of flexures.

The structure of the prior art gimbaled gyroscope requires that the thin inner flexures be surrounded by a thicker gimbal ring or plate. The boron diffusion process utilized to define the gimbal ring and the flexures causes the thicker gimbal Plate to shrink more than the flexures, causing the inner flexures to be in compression, and in some cases to buckle. This buckling introduces variations and uncertainty in the resonant frequency of the inner gimbal member which is difficult to predict and control.

Although the buckling problem can perhaps be eliminated by adding strain relief slots near the inner flexures, the frequency of the gyroscope's dive axis must equal the resonant frequency of the sense axis, requiring prior measurement and trimming of the resonant frequency, precision frequency generators, and precise temperature control.

Alternatively, automatic frequency control loops may be added to control the drive and sense axis frequencies. The control loop signals, however, must be accurate and may interfere with the gyroscope's output signal. In addition, differences in resonant frequency between the drive and sense axes can develop due to minor variations in spring constant of the flexures or work-hardening of the flexures over time.

SUMMARY OF THE INVENTION

This invention features a micromechanical gyroscope including a mass symmetrically supported about both drive and sense axes, for detecting rotational movement about an input axis. The gyroscope includes an inertial mass supported by two pairs of flexures. Each pair of flexures are attached to diametrically opposed sides of the inertial mass and a gyroscope support frame. Additionally, each of the flexures are oriented at generally a 45° angle from both the drive and sense axes.

In response to an applied drive signal, the inertial mass is induced to vibrate about a drive axis which is co-planar with and orthogonal to the sense axis. Both pair of flexures participate equally during rotation of the mass. Thus, the present invention provides a micromechanical gyroscope with flexures coupling the inertial mass and which are symmetrically oriented about both the drive and sense axes.

DESCRIPTION OF THE DRAWINGS

These, and other features of the present invention will be better understood by reading the following detailed description, taken together with the drawings in which.

DETAILED DESCRIPTION OF THE INVENTION

Figure 1:
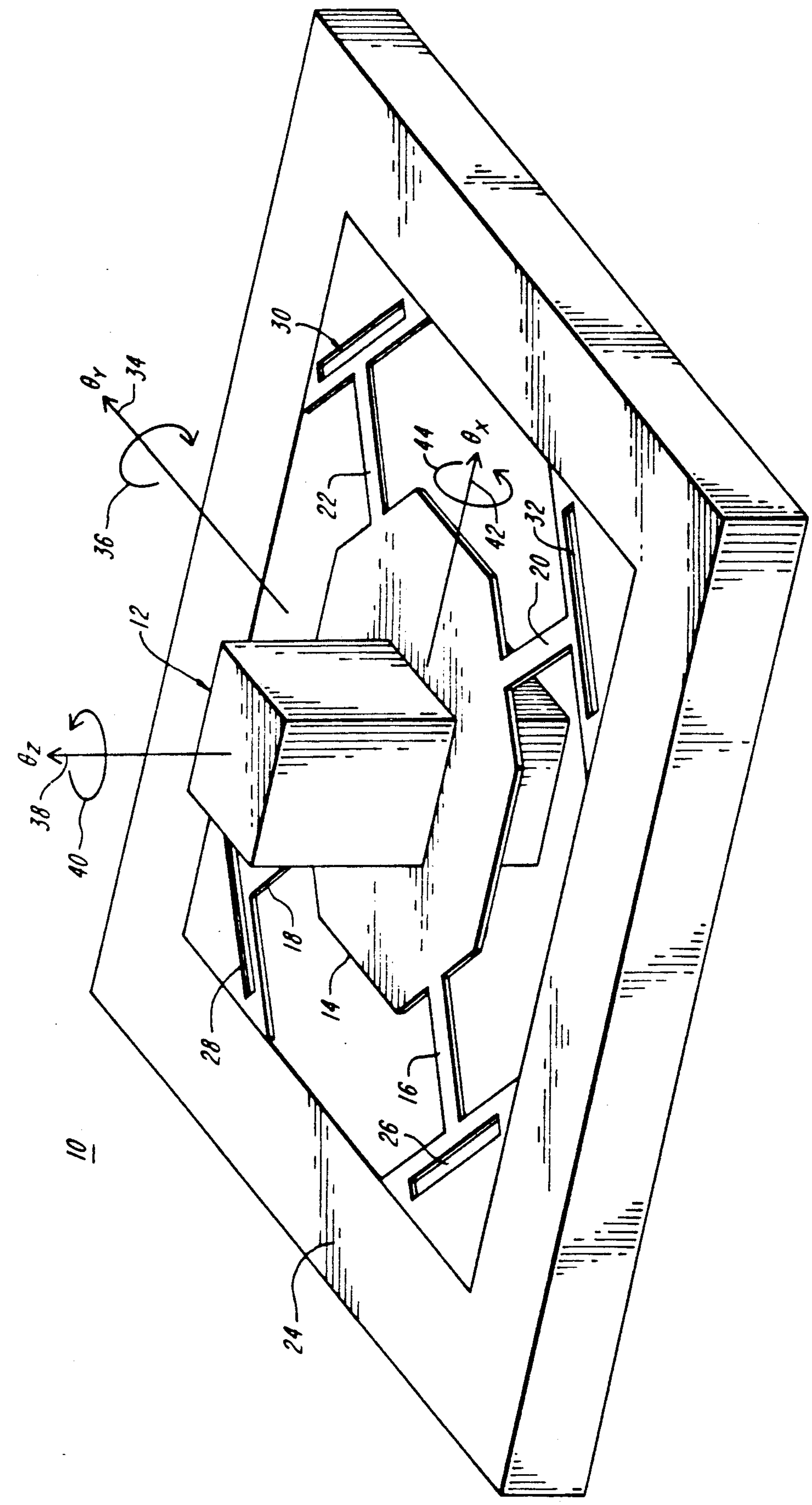
FIG. 1 is a plan view of the micromechanical gyroscope with symmetric drive and sense axes of the present invention, with drive and sense electrodes omitted for clarity.

The symmetrical micromechanical gyroscope 10, FIG. 1, according to the present invention includes an inertial mass 12 coupled to a mass support plate 14 which is used to both drive (or torque) the gyroscope and to sense gyroscope position. Mass support plate 14 and inertial mass 12 are supported by four flexures or flexural springs 16–22. The four flexures, together with the moment of inertia tensor, determine the resonant frequencies of the device. The flexures are in turn coupled to gyroscope support frame 24.

In the preferred embodiment, the symmetrical, micromechanical gyroscope of the present invention is fabricated from a single, unitary silicon substrate. The various structures such as the mass support plate 14 and the flexures 16–22 are fabricated by selective Boron doping and a subsequent anisotropic etching processes. Such fabrication techniques are well known to those skilled in the art and are discussed in greater detail in co-pending U.S. patent application Ser. No. 479,854 assigned to the same assignee of the present invention and incorporated herein by reference. Although the preferred embodiment of the present invention is fabricated from a single, unitary silicon substrate, this is not a limitation of the present invention as it is contemplated that such a device may be fabricated from quartz, or other materials such as polycrystalline silicon, silicon nitride, silicon dioxide, tungsten, nickel, silver or gold.

Since the Boron diffusion process of the preferred embodiment often causes unequal or unbalanced shrinking of the silicon lattice structure, strain relief slots 26–32 may be provided proximate one end of flexures 16–22, for relieving and equalizing tension on the flexures. Each strain relief slot 26–32 may be individually sized and trimmed to selectively control tension on each of the flexures. Such a system and method for trimming the resonant frequency of a structure utilizing strain relief slots is disclosed in co-pending U.S. patent application No. 470,938, assigned to the same assignee as the present invention, and incorporated herein by reference.

The operation of the symmetrical, micromechanical gyroscope of the present invention is generally identical to that of prior art gyroscopes. The inertial mass support plate 14 and inertial mass 12 are capacitively torqued and induced to vibrate about the Y axis 34 in the direction of arrow 36, at the resonant frequency of the structure. The input rate to be sensed is a rotation about the axis 38 as shown by arrow 40. The interaction of the input rate about the Z axis and the induced vibration about the Y or drive axis 34 create a Coriolis force about the X or sensa axis 42, which causes a vibration of the inertial mass 12 and mass plate 14 23 about the X axis in the direction of arrow 44. This vibration about the X axis 42 is sensed and the mass plate rebalanced to its null position, The voltage required to rebalance the gyroscope about the X axis is the measured output of the gyroscope, and is proportional to the input rate.

The symmetry of the micromechanical gyroscope according to the present invention is achieved by orienting the flexures 16–22 at generally a 45° angle to the drive and sense axes. For example, a first pair of flexures 16–18 are each arranged at a 45° angle to the X or sense axis 42; while a second pair of flexures 20–22 are coupled to a diametrically opposed side of the inertial mass support plate 14 and gyroscope frame 24 also at a generally 45° angle from the X or sense axis 42.

The flexures are similarly symmetrically arranged about the drive or Y axis 34. For example, a new flexure pair comprising flexures 18 and 22 is attached to a first side of inertial mass support plate 14 and gyroscope support frame 24 whereby each of the flexures 18 and 22 are arranged at generally a 45° angle from the drive or Y axis 34. A second new flexure pair comprised of flexures 16 and 20 is disposed on a diametrically opposed side of the inertial mass support plate and gyroscope frame from flexures 18 and 22. Flexures 16 23 and 20 are also disposed at 45° angles from the drive or Y axis 34. Thus, all four flexures 16–22 participate equally during rotation about both the X and Y axes 42,34, respectively. This symmetry ensures that even if minor variations in spring constant occur due to either manufacturing processes or work-hardening. the resonant frequencies of the drive and sense axes of the gyroscope will remain identical.

The symmetrical micromechanical gyroscope of the present invention provides a gyroscope wherein the resonant frequencies of the drive and sense axes will shift together and in equal amounts if temperature or other variables cause frequency drift. thus maintaining generally identical drive and sense resonant frequencies. Additionally, operation of the symmetrical, micromechanical gyroscope of the present invention at its resonant frequency greatly reduces the drive voltage required to induce vibration in the inertial mass. Reduced drive voltage allows the gyroscope to operate with much higher sensitivity. Further, the new symmetric design of the micromechanical gyroscope of the present invention also eliminates inner flexure buckling problems which exist in the prior art and which is a constant problem with the current gimbaled gyroscope design.

Figure 2:
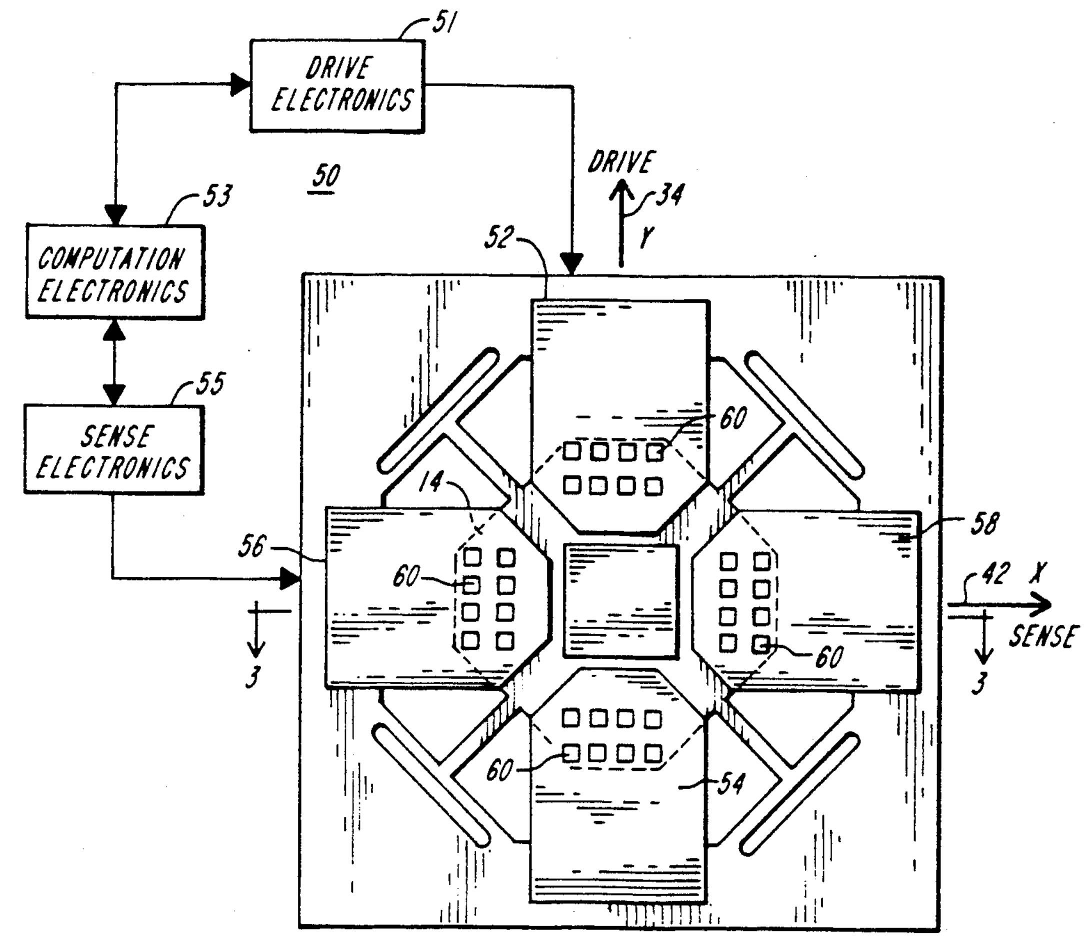
FIG. 2 is a top view of the micromechanical gyroscope with symmetric drive and sense axes according to the present invention, with drive and sense electrodes shown.

The symmetrical, micromechanical gyroscope of the present invention 50, FIG. 2, is shown in a top view wherein are schematically illustrated cantilevered drive electrodes 52,54 and sense electrodes 56,58. Operation of the symmetrical, micromechanical gyroscope of the present invention utilizing either electrostatic or electromagnetic drive and sense electronics, or combinations thereof, is known to those skilled in the art and includes drive electronics 51 coupled to drive electrodes 52,54 and sense electronics 55 coupled to sense electrodes 56,58. Computation electronics 53, responsive to the drive and sense electronics, are provided to compute the amount of angular rotation about the input axis which is sensed by the gyroscope. An example of such electronics may be found in co-pending U.S. patent application No. 493,327 assigned to the same assignee as the present invention, and incorporated herein by reference.

In addition to cantilevered or bridge drive and sense electrodes, buried electrodes disposed within gyroscope support frame 24 under inertial mass support plate 14 or combinations of buried and cantilevered electrodes are contemplated by the present invention. Bridge electrodes 52–58 are attached at one end to gyroscope support frame 24 and are cantilevered so as to provide at least a portion of the electrodes which extends over a portion of inertial mass support plate 14 shown in dashed lines.

Perforations or holes 60 shown in this embodiment in the cantilevered electrodes 52–58, are provided to reduce squeeze-film damping. In an alternative embodiment, the perforations may be provided in the area of inertial mass support plate 14 which underlies the cantilevered electrodes 52–58. The perforations increase the mechanical quality factor of the gyroscope of the present invention, and may allow operation of the gyroscope at atmospheric pressure, without a vacuum package.

Figure 3:
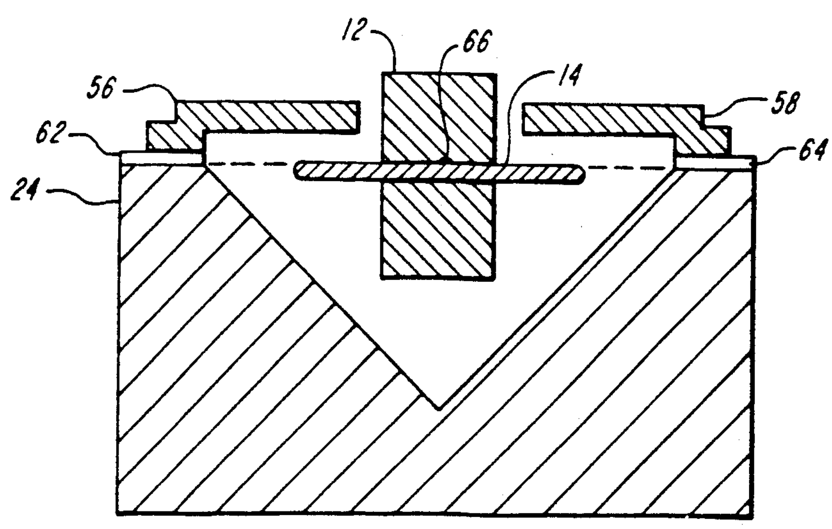
FIG. 3 is a cross sectional view of the symmetrical micromechanical gyroscope of the present invention taken along 19 lines 3—3 of FIG. 2.

The micromechanical gyroscope of FIG. 2 according to the present invention is shown in cross section in FIG. 3 wherein is shown sense electrodes 56 and 58 coupled to gyroscope frame 24 through an isolation region 62 and 64. In one embodiment, the isolation regions include a dielectric material such as silicon dioxide, silicon nitride, combinations thereof, or other suitable materials such as boron or phosphorus doped glass. Additionally, isolation regions 62 and 64 may be formed by doping regions 62 and 64 with a P type dopant thus forming a PN junction isolation region between P regions 62,64 and the N substrate of gyroscope support frame 24. Cantilevered sense electrodes 56 and 58 extend over a portion of inertial mass support plate 14.

Inertial mass 12 is located on inertial mass support plate 14. In one embodiment, inertial mass 12 is approximately 100 microns high extending approximately 50 microns on either side of inertial mass support plate 14 as providing a center of gravity as shown approximately at point 66, in plane with the drive or Y axis 34 and the sense or X axis 42 Inertial mass 12 may be formed by plating a heavy metal such as gold or other suitable materials, onto inertial mass support plate 14.

In the preferred embodiment, it is proposed to operate the symmetrical, micromechanical gyroscope of the present invention at a resonant frequency of approximately 10 KHz with a 10 volt drive voltage. The equations of motion of the symmetrical, micromechanical gyroscope of the present invention are almost identical to the equations of motion for the prior art gimbaled gyroscope. The angular momentum, $I_n$, about the X, Y, and Z axes are defined as follows:

$$I_x = \int\int\int (y^2+z^2)\rho dV \quad 1.$$

$$I_y = \int\int\int (x^2+z^2)\rho dV \quad 2.$$

$$I_z = \int\int\int (x^2+y^2)\rho dV \quad 3.$$

The input rotation rate to be sensed is $\Omega_z$. Therefore, the equation of motion about the Y (drive) axis is:

$$I_y\ddot{\theta}_y + k_D\dot{\theta}_y + k_{sp}\theta_y = \tau_y = \tau_{yp}\text{COS}(\omega_R t) \quad 4.$$

where $k_D$ is the damping co-efficient, $k_{sp}$ is the rotational spring constant of the flexures, $\tau_y$ is the applied drive torque. and $\tau_{yp}$ is the peak value of the applied torque. Assuming that the inertial mass and inertial mass plate are driven at their resonant frequency $$\omega_r = \left( \frac{k_{sp}}{I_y} \right)^{\frac{1}{2}}$$

then equation 4 becomes $$\theta_y = \frac{\tau_y}{j\omega k_D} = \frac{\tau_{yp}\sin(\omega_r t)}{\omega k_D}. \qquad 5$$

It should be noted that there is a $-\pi/2$ phase shift between applied torque and motion at the resonant frequency. By symmetry, the result for the X axis is:

$$\theta_x = \frac{\tau_x}{j\omega k_D}. \qquad 6$$

The prior art gimbaled gyroscope drive axis is generally operated below resonant frequency where the drive impedance is dominated by the spring constant of the flexures. The the drive torque is proportional to the square of the drive voltage. In contrast, the symmetrical, micromechanical gyroscope of the present invention requires a much lower drive voltage, lower by a factor of the square root of Q to yield:

$$V_{drive,DR} \propto (\omega_r k_D \theta_y)^{175} \qquad 7.$$

The torque about the sense or X axis is an interaction between the input rate about the Z axis, $\omega_z$, and the oscillating angular momentum vector about the drive or Y axis. The resulting torque is:

$$\tau_x = (I_x + I_y - I_z)\dot{\theta}_y\Omega_z \equiv I\dot{\theta}_y\Omega_z \qquad 8.$$

where the quantity I is given by:

$$I = 2\int\int\int Z^2 \rho dV \qquad 9.$$

Combining equation 8 with equation 6 yields:

$$\theta_x = \frac{I\theta_y\Omega_Z}{k_D}. \qquad 10$$

The open-loop sensitivity of the symmetrical, micromechanical gyroscope is the ratio of the sense angle to the input rate according to the formula:

$$S_{OL} \equiv \frac{\theta_x}{\Omega_Z} = \frac{I\theta_y}{k_D}. \qquad 11$$

The closed-loop sensitivity is expressed as the ratio of the rebalance torque (equal to the coriolis interaction torque) to the input rate according to the formula:

$$S_{CL} \equiv \frac{\tau_x}{\Omega_Z} = I\dot{\theta}_y = j\omega_r I\theta_y. \qquad 12$$

Modifications and substitutions by one of ordinary skill in the art are considered to be within the scope to the present invention, which is not to be limited except by the claims which follow.

I claim:

1. A symmetrical, micromechanical gyroscope, for detecting rotational movement about an input axis, comprising:

a gyroscope support frame including a cavity above which is suspended an inertial mass;

first and second pairs of flexures suspending said mass above said cavity;

said first pair of flexures including first and second flexible elements, each of said flexible elements including a first end coupled to a first side of said mass, and a second end coupled to a first portion of said support frame, each of said first and second flexible elements oriented generally at a 45° angle from a sense axis;

said second pair of flexures including third and forth flexible elements, each of said flexible elements including a first end coupled to a second side of said mass diametrically opposed from said first side of the mass, and a second end coupled to a second portion of said support frame, diametrically opposed from the first portion of said support frame, said third and forth flexible elements oriented generally at a 45° angle from said sense axis;

a drive axis, about which said inertial mass is induced to vibrate in response to an applied drive signal, said drive axis coplanar with and orthogonal to said sense axis;

means for driving said hydroscope about said drive axis;

means for sensing rotation of said inertial mass about said sense axis; and wherein each flexible element of said first and second pair of flexures is oriented generally at a 45° angle from said drive axis, for providing a micromechanical gyroscope with flexures coupling said inertial mass which are symmetrically oriented about both said drive and sense axes.

2. The gyroscope of claim 1 wherein said first and second pairs of flexures are generally co-planar with a surface of said gyroscope support frame, with at least a portion of a surface of said inertial mass, and with said sense and drive axes.

3. The gyroscope of claim 1 wherein said gyroscope support frame, inertial mass, and first and second pairs of flexures are fabricated from a single silicon substrate.

4. The gyroscope of claim 3 wherein said cavity is formed by anisotropic etching of said silicon substrate.

5. The gyroscope of claim 1 wherein said inertial mass includes a structure extending above and below the planar surface of said gyroscope support frame.

6. The gyroscope of claim 5 wherein said inertial mass is formed by plating.

7. The gyroscope of claim 1 further including a plurality of strain relief slots disposed proximate one end of each of said first and second pairs of flexures.

8. The gyroscope of claim 1 wherein said at least one means for driving includes a drive electrode and said at least one means for sensing includes at least one sense electrode.

9. The gyroscope of claim 8 wherein said drive and sense means are buried electrodes or bridge electrodes.

10. A symmetrical, micromechanical gyroscope fabricated from a single unitary silicon substrate, for detecting rotational movement about an input axis, comprising:

a gyroscope support frame including a cavity within which is suspended an inertial mass;

first and second pair of flexures suspending said mass within said cavity;

said first and second pair of flexures generally co-planar with a surface of said gyroscope support frame and with a sense axis about which rotational movement of said inertial mass may be sensed;

said first pair of flexures including first and second flexible elements, each of said flexible elements including a first end coupled to a first side of said mass, and a second end coupled to a first portion of said support frame, each of said first and second flexible elements oriented generally at a 45° angle from said sense axis;

said second pair of flexures including third and forth flexible elements, each of said flexible elements including a first end coupled to a second side of said mass diametrically opposed from said first side of the mass, and a second end coupled to a second portion of said support frame, diametrically opposed from the first portion of said support frame, said third and forth flexible elements oriented generally at a 45° angle from said sense axis;

a drive axis, about which said inertial mass is induced to vibrate in response to an applied drive signal, said drive axis co-planar with and orthogonal to said sense axis;

wherein each flexible element of said first and second pair of flexures is oriented generally at a 45° angle from said drive axis, for providing a micromechanical gyroscope with flexures supporting said inertial mass which are symmetrically oriented about both said drive and sense axes;

drive means, for driving said gyroscope about said drive axis;

sense means, for sensing rotation of said inertial mass about said sense axis; and means, responsive to said drive and sense means, for calculating the rotation of said gyroscope about said input axis.

* * * * *

UNITED STATES PATENT AND TRADEMARK OFFICE
CERTIFICATE OF CORRECTION

PATENT NO. : 5,203,208

DATED : April 20, 1993

INVENTOR(S) : Jonathan J. Bernstein

It is certified that error appears in the above-identified patent and that said Letters Patent is hereby corrected as shown below:

Column 1, line 24, "Plate" should read --plate--.

Column 2, line 13, "along 19 lines" should read --along lines--.

Column 2, line 67, "sensa" should read --sense--.

Column 2, line 68, "plate 14 23 about" should read --plate 14 about--.

Column 3, line 24, "Flexures 16 23 and 20" should read --Flexures 16 and 20--.

Column 5, line 28, in equation 7, "178" should read --1/2--.

Column 5, line 31, "$\omega_z$" should read --$\Omega_z$--.

Column 6, line 25, "hydroscope" should read --gyroscope--.

Signed and Sealed this

Twenty-sixth Day of April, 1994

Attest:

BRUCE LEHMAN

*Attesting Officer* *Commissioner of Patents and Trademarks*

Adverse Decisions In Interference

Patent No. 5,203,208, Jonathan J. Bernstein, SYMMETRICAL MICROMECHANICAL GYROSCOPE, Interference No. 103,908, final judgment adverse to the patentee rendered November 18, 1999, as to claims 1-10.

*(Official Gazette February 15, 2000)*